United States Patent
Zarbo

(10) Patent No.: US 6,361,084 B1
(45) Date of Patent: Mar. 26, 2002

(54) ADJUSTABLE PLUMBING CONNECTOR AND METHOD

(76) Inventor: Vincent M. Zarbo, 4546 Rockledge La., Port Orange, FL (US) 32127

(*) Notice: Subject to any disclaimer, the term of this patent is extended or adjusted under 35 U.S.C. 154(b) by 0 days.

(21) Appl. No.: 09/498,489

(22) Filed: Feb. 3, 2000

(51) Int. Cl.[7] ................................................. F16L 17/00
(52) U.S. Cl. .................. 285/341; 285/334.2; 285/382.7
(58) Field of Search .............................. 285/334.2, 341, 285/342, 343, 382.7; 137/360; 174/75 C

(56) References Cited

U.S. PATENT DOCUMENTS

| | | | | |
|---|---|---|---|---|
| 3,676,573 A | * | 7/1972 | Avery | 285/341 |
| 4,593,940 A | * | 6/1986 | Wilder | 285/341 |
| 5,068,494 A | * | 11/1991 | Bolante | 285/341 |
| 5,385,330 A | | 1/1995 | Joseph | |
| 5,620,187 A | * | 4/1997 | Jia | 285/341 |

* cited by examiner

Primary Examiner—Lynne H. Browne
Assistant Examiner—Aaron Dunwoody
(74) Attorney, Agent, or Firm—Edward M. Livingston, Esq.

(57) ABSTRACT

A connector sleeve (2) has a structure-attachment flange (9) on a flange end, a seal surface (4, 5, 15, 17) on a seal end and a nut-retainer ring (8, 14, 16) intermediate the structure-attachment flange and the seal end of an outside periphery of the connector sleeve. A connector nut (7) is contained rotatably on the outside periphery of the connector sleeve with the nut-retainer ring buttressing a retainer wall that is intermediate a circumferentially pipe-engagement inside periphery and a larger circumferentially straight-threaded inside periphery of the connector nut. Straight inside threading on the inside periphery of the connector nut is matched to straight outside threading of a fluid-controller sleeve (3). The pipe-engagement inside periphery of the connector nut and an inside periphery of the fluid-controller sleeve have slidable clearance of outside peripheral portions of an intended pipe (6). A seal ring (1, 13, 18) having at least three-surface-seal contact with the seal end of the connector sleeve, a seal end of the fluid-controller sleeve and the outside periphery of the intended pipe is thread-tightened intermediate the seal end of the connector sleeve and the seal end of the fluid-controller sleeve after orienting a fluid controller such as a sill cock (11) as desired.

13 Claims, 4 Drawing Sheets

ADJUSTABLE PLUMBING CONNECTOR AND METHOD

BACKGROUND OF THE INVENTION

This invention relates to connecting plumbing such as sill cocks and other fluid controllers to tubular fluid conveyances on buildings and other structures.

Connecting sill cocks and other fluid controllers to such plumbing as water pipes of houses and other buildings has long been a time-consuming plumbing chore during and after construction of houses and other buildings. It was simplified greatly by U.S. Pat. No. 5,385,330, issued to Joseph on Jan. 31, 1995. The Joseph patent described a compression sill-cock flange having a tapered inside sealing wall against which a complimentary tapered sealing member such as a ferrule was sealing-abutted with force from straight-thread screwing of a sill-cock pipe against the sealing member.

Although the Joseph patent departed from use of tapered pipe thread for a plumbing connection of sill cocks to pipes, the Joseph patent did not go far enough to solve all problems as does the present invention. For instance, the entire sill cock and the sill-cock flange must be counter rotated to achieve a seal with a tapered ferrule. This requires disengagement of the sill-cock flange from a building or other structure in order to achieve desired orientation of an outlet aperture on the sill cock. Due to random termination of threading, achieving the desired orientation is not easy nor always achievable. Even though achieved with considerable difficulty, the orientation does not remain constant or fixed when the sill cock is removed and then re-connected or replaced. Orientation of the sill cock and its outlet orifice, therefore, is not exact and can not be made uniform for a plurality of sill cocks, even with considerable time and effort of a plumber.

Further, the Joseph patent is limited to a circumferential inside sealing wall that is tapered conically inward in a direction towards a seal end of a pipe coupling on the sill-cock flange. This restricts selection of sealing members to a double- tapered ferrule.

Examples of other known related but different sill-cock connections that employ various forms of tapered pipe threading and, therefore, are not deemed to be sufficiently similar to this invention for detail comparison include U.S. Pat. Nos. 1,080,520, 3,971,401, 2,210,986, 2,652,224, 4,836,237, 4,316, 481, 4,182,356 and 5,129,416.

SUMMARY OF THE INVENTION

Objects of patentable novelty and utility taught by this invention are to provide an adjustable plumbing connector and method which:

allows quick and convenient adjustment of circumferential positioning of a sill cock or other fluid controller on a pipe for desired circumferential orientation in addition to linear positioning of an outlet aperture of the sill cock in relationship to the pipe;

allows use of a selection of sealing members; and allows use of a selection of attachments of a connector nut to a connector sleeve.

This invention accomplishes these and other objectives with a connector sleeve having a structure-attachment flange on a flange end, a seal surface on a seal end and a nut-retainer ring intermediate the structure-attachment flange and the seal end of an outside periphery of the connector sleeve. A connector nut is contained rotatably on the outside periphery of the connector sleeve with the nut-retainer ring buttressing a circular retainer wall that is intermediate a circumferentially pipe-engagement inside periphery and a larger circumferentially straight-threaded inside periphery of the connector nut. Straight inside threading on the inside periphery of the connector nut is matched to straight outside threading of a fluid-controller sleeve. The pipe-engagement inside periphery of the connector nut and an inside periphery of the fluid-controller sleeve have slidable clearance of an outside periphery of an intended pipe. A seal ring having at least three-surface-seal contact with the seal end of the connector sleeve, a seal end of the fluid-controller sleeve and the outside periphery of the intended pipe is thread-tightened intermediate the seal end of the connector sleeve and the seal end of the fluid-controller sleeve after orienting the sill cock as desired.

Optionally, the nut-retainer ring proximate the seal end of the connector sleeve can be (a) a retainer flange extended radially, (b) a snap ring in a groove, (c) a threaded ring, (d) circumferentially segmented radial extensions, or (e) other nut retainer. Further optionally, the seal ring can be: (a) an O-ring having predetermined resilience, flexibility and memory, (b) a double-tapered ferrule having predetermined resilience, flexibility and memory, (c) a single-tapered ferrule having predetermined resilience, flexibility and memory, or (d) other ring having a geometrical cross section for at least three-surface-sealing contact when squeezed between the seal ends of the connector sleeve and the fluid-controller sleeve. The structure-attachment flange has predetermined structure-attachment structure.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figure 1:
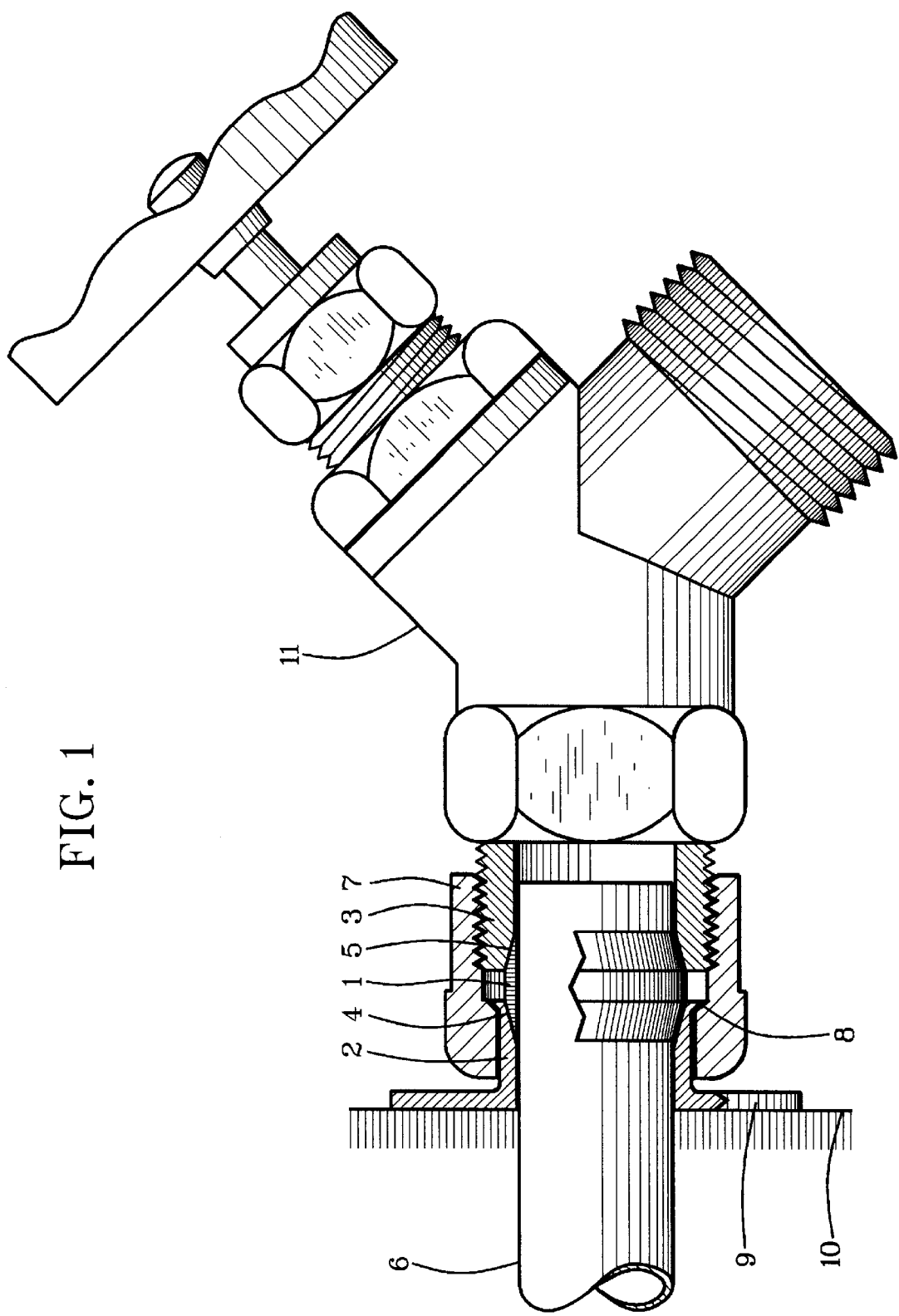
FIG. 1 is a partially cutaway side view of a sill cock as a fluid controller on an intended pipe to which it is connectable with a linearly and circumferentially adjustable plumbing connector having a double-tapered seal ring and a flared connector sleeve for rotatable retainment of a connector nut.

Listed numerically below with reference to the drawings are terms used to describe features of this invention. These terms and numbers assigned to them designate the same features throughout this description.

1. Double-tapered seal ring
2. Connector sleeve
3. Fluid-controller sleeve
4. Inside connector cone
5. Inside fluid-controller cone
6. Intended pipe
7. Connector nut
8. Flare
9. Structure-attachment flange
10. Intended structure
11. Sill cock
12. Fluid diverter
13. O-ring
14. Snap ring
15. Orthogonal connector seal
16. Threaded ring
17. Orthogonal fluid-controller seal
18. Single-tapered ferrule
19. Nut seal surface
20. Fastener bays Reference is made first to FIG. 1. An adjustable plumbing connector has a seal ring such as a double-tapered seal ring 1 that is forced from opposite directions linearly between a sleeve seal surface of a connector sleeve 2 and a fluid-controller seal surface of a predetermined fluid-controller sleeve 3. For this embodiment of the invention, the sleeve seal surface is an inside connector cone 4 and the fluid-controller seal surface is an inside fluid-controller cone 5 for forcing coned ends of the double-tapered seal ring 1 inwardly against an outside periphery of an intended pipe 6.

Linear force of the connector sleeve 2 and the fluid-controller sleeve 3 from opposite directions is provided by tightening-direction rotation of a connector nut 7 having a straight-threaded inside periphery on the fluid-controller sleeve 3 which has matched straight outside threading. In opposition to the linear force, the connector nut 7 is contained rotatably on the outside periphery of the connector sleeve 2 with a nut-retainer ring such as a flare 8 or other flange-like structure proximate a seal end of the connector sleeve 2. Straight threading is machine threading which is not tapered.

Figure 2:
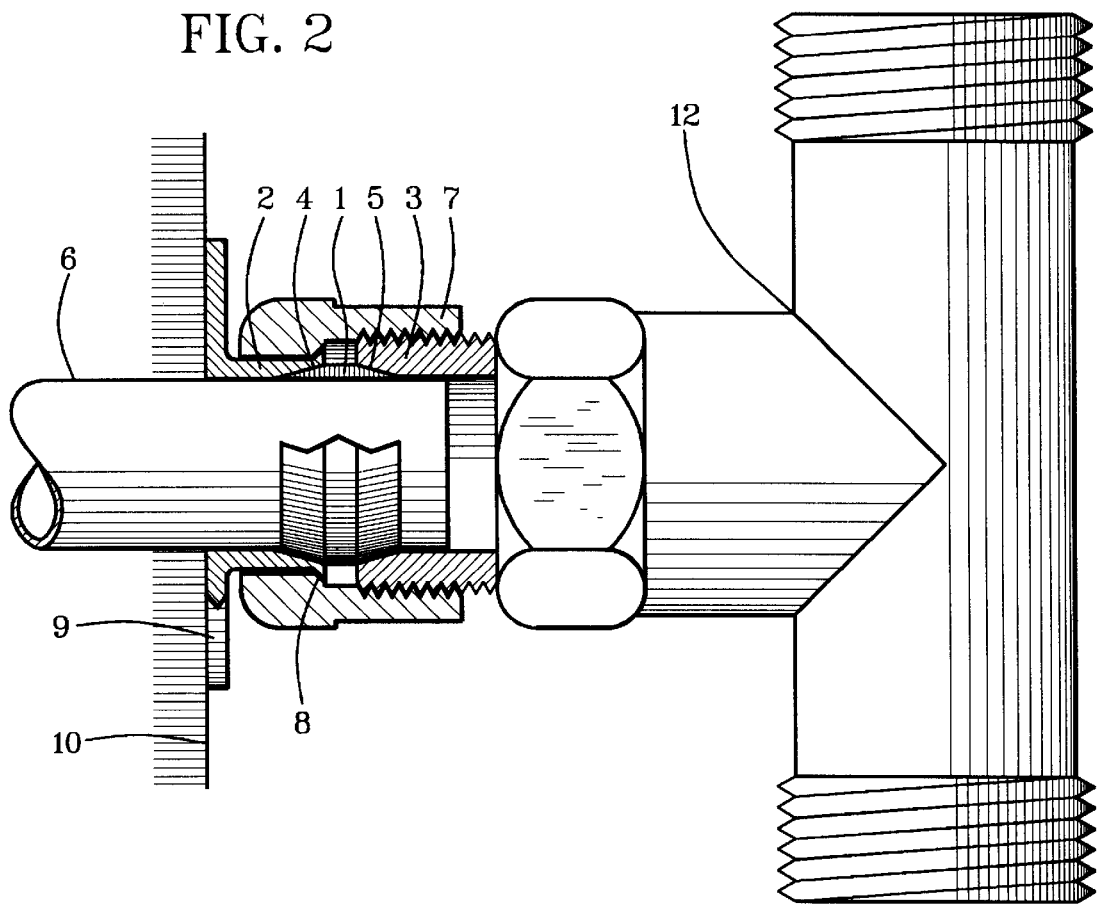
FIG. 2 is the plumbing connector of FIG. 1 employed for adjustable connection of a plumbing T-joint to the intended pipe.

Referring to FIGS. 1–2, a structure-attachment flange 9 on a flange end of the connector sleeve 2 is employed to attach the adjustable plumbing connector to an intended structure 10 for adjustable connection of a fluid controller such as a sill cock 11 or a fluid-diverter 12 to the intended structure 10 from which the intended pipe 6 is extended.

The adjustable plumbing connector provides both linear and circumferential adjustment. Linear adjustment is achievable precisely by inserting the intended pipe 6 through the connector sleeve 2 and then into the fluid-controller sleeve 3 a sufficient distance to seat the structure-attachment flange 9 snugly against the intended structure 10. This is assuming that approximate length of the extension of the intended pipe 6 from the intended structure 10 has been provided previously. An additional step of linear adjustment is connecting the sill cock 11 or other fluid controller to an intended pipe 6 having construction length during construction, disconnecting it after construction, cutting the intended pipe 6 to approximately correct length and then connecting the fluid controller onto the intended pipe 6 with length adjustment for snug fit of the structure-attachment flange 9 against the intended structure 10.

Circumferential or attitudinal adjustment of the sill cock 11, the flow diverter 12 or other fluid controller is achieved by hand-orientation and holding of an intended flow controller in a desired circumferential orientation while tightening the connector nut 7 onto the fluid-controller sleeve 3.

Figure 3:
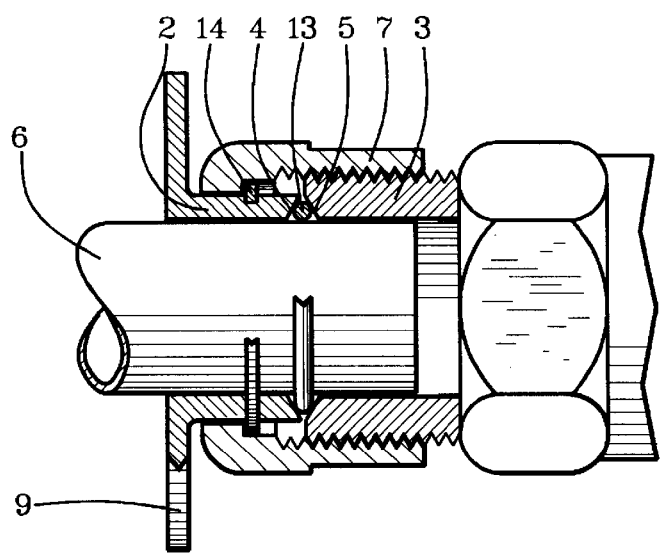
FIG. 3 is a partially cutaway side view of an adjustable plumbing connector having an O-ring between an inside taper of a connector sleeve and an inside taper of a fluid-controller sleeve and having a snap ring for rotatable retainment of the connector nut.

Referring to FIGS. 1 and 3, the seal ring can be an O-ring 13 having predetermined dimensions between the inside connector cone 4 and the inside fluid-controller cone 5 which have predetermined dimensions and taper angles for sealing contact of the O-ring 13 with at least the outside periphery of the intended pipe 6, the sleeve seal surface of the inside connector cone 4 and the fluid-controller seal surface of the inside fluid-controller cone 5. The nut-retainer ring can be a snap ring 14 in a snap-ring groove on the connector sleeve 2 as an option for rotatable retainment of the connector nut 7.

Figure 4:
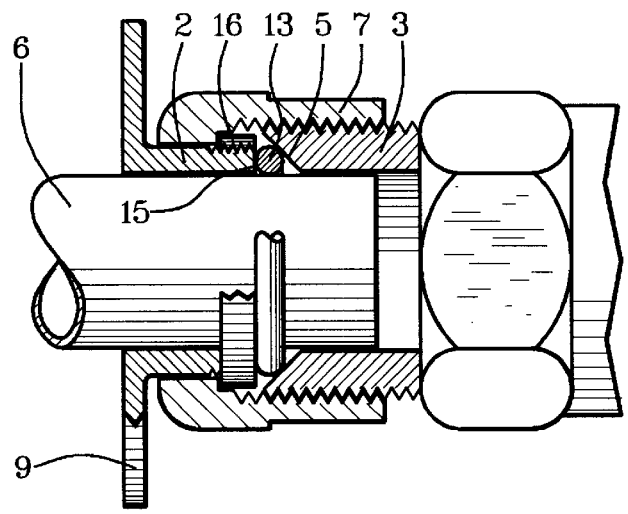
FIG. 4 is a partially cutaway side view of an adjustable plumbing connector having an O-ring between an orthogonal wall of a connector sleeve and an inside taper of a fluid-controller sleeve and having a threaded retainer ring for rotatable retainment of the connector nut.

Referring to FIGS. 1 and 4, the seal ring can be the O-ring 13 having predetermined dimensions between an orthogonal connector seal 15 and the inside fluid-controller cone 5 which have predetermined dimensions and taper angles for sealing contact of the O-ring 13 with at least the outside periphery of the intended pipe 6, the sleeve seal surface of the orthogonal connector seal 15 and the fluid-controller seal surface of the inside fluid-controller cone 5. The nut-retainer ring can be a threaded ring 16 that is threaded onto the connector sleeve 2 as an option for rotatable retainment of the connector nut 7.

Figure 5:
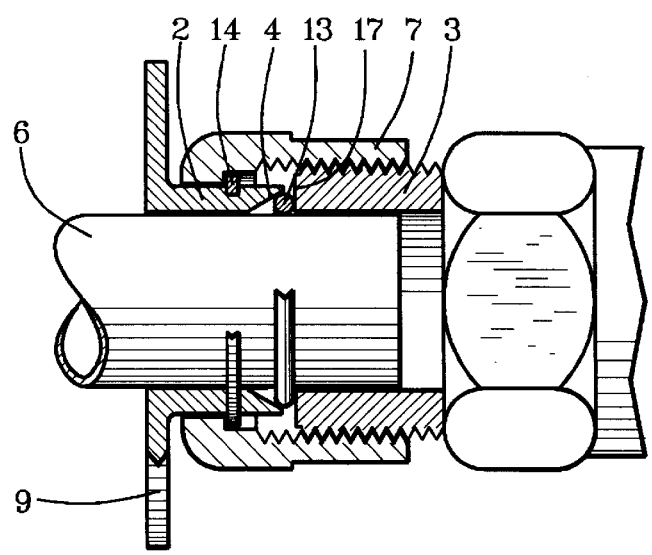
FIG. 5 is a partially cutaway side view of an adjustable plumbing connector having an O-ring between an inside taper of a connector sleeve and an orthogonal wall of a fluid-controller sleeve and having a snap ring for rotatable retainment of the connector nut.

Referring to FIGS. 1, 3 and 5, the seal ring can be the O-ring 13 having predetermined dimensions between the inside connector cone 4 and an orthogonal fluid-controller seal 17 which have predetermined dimensions and taper angles for sealing contact of the O-ring 13 with at least the outside periphery of the intended pipe 6, the sleeve seal surface of the orthogonal fluid-controller seal 17 and the fluid-controller seal surface of the inside connector cone 4.

Figure 6:
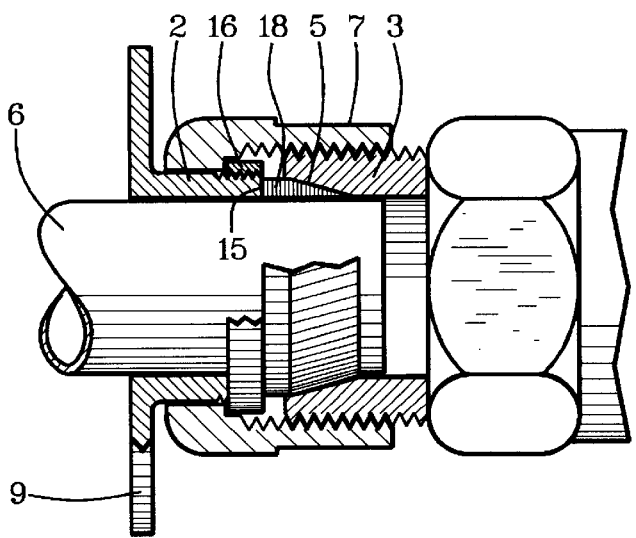
FIG. 6 is a partially cutaway side view of an adjustable plumbing connector having a single-tapered seal ring between an orthogonal wall of a connector sleeve and an inside taper of a fluid-controller sleeve and having a threaded retainer ring for rotatable retainment of the connector nut.

Referring to FIGS. 1, 4 and 6, the seal ring can be a single-tapered ferrule 18 having predetermined dimensions between the orthogonal connector seal 15 and the inside fluid-controller cone 5 which have predetermined dimensions and taper angles for sealing contact of the single-tapered ferrule 18 with at least the outside periphery of the intended pipe 6, the sleeve seal surface of the orthogonal connector seal 15 and the fluid-controller seal surface of the inside fluid-controller cone 5.

Figure 7:
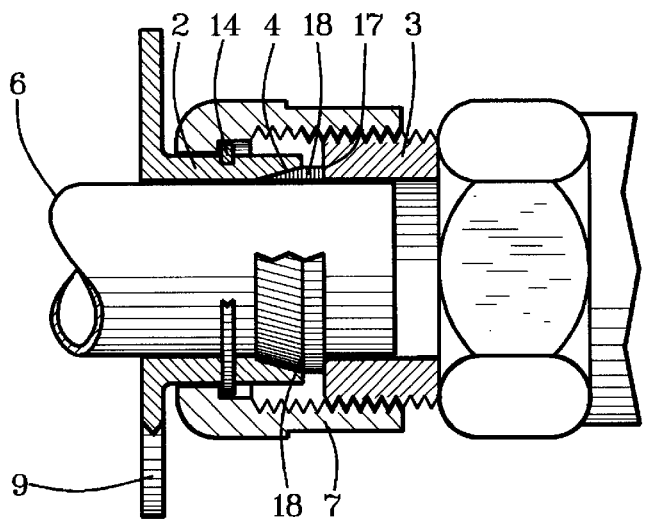
FIG. 7 is a partially cutaway side view of an adjustable plumbing connector having a single-tapered seal ring between an inside taper of a connector sleeve and an orthogonal wall of a fluid-controller sleeve and having a snap ring for rotatable retainment of the connector nut.
Figure 8:
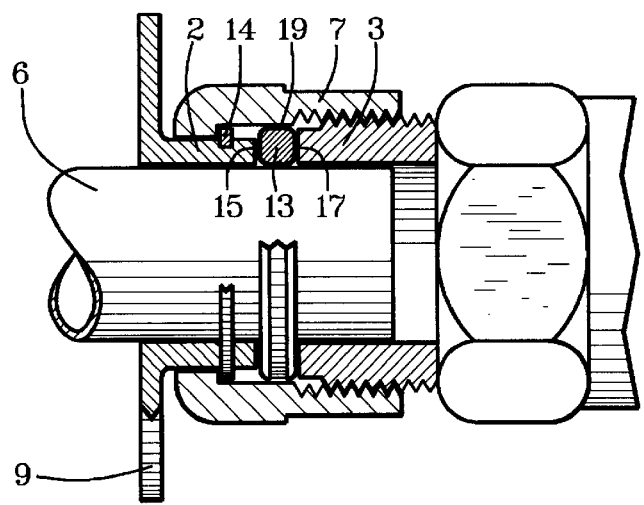
FIG. 8 is a partially cutaway side view of an adjustable plumbing connector having an O-ring with a predetermined cross-sectional configuration between an orthogonal wall of a connector sleeve and an orthogonal wall of a fluid-controller sleeve and having a snap ring for rotatable retainment of the connector nut.

Referring to FIGS. 1, 5 and 7, the seal ring can be the single-tapered ferrule 18 having predetermined dimensions between the inside connector cone 4 and the orthogonal fluid-controller seal 17.

Referring to FIGS. 1, 3, 4 and 8, the seal ring can be the O-ring 13 having predetermined dimensions between the orthogonal connector seal 15 and the orthogonal fluid-controller seal 17 for sealing contact with the outside periphery of the intended pipe 6 and a nut seal surface 19 in addition to sealing contact with the orthogonal connector seal 15 and the orthogonal fluid-controller seal 17. The O-ring 13 can have a sufficiently large cross section and/or its cross section can be rectangular with optionally rounded corners to contact the four walls shown. This embodiment employs four-surface contact instead of three-surface contact as described in relation to FIGS. 1–7 for a seal ring.

Figure 9:
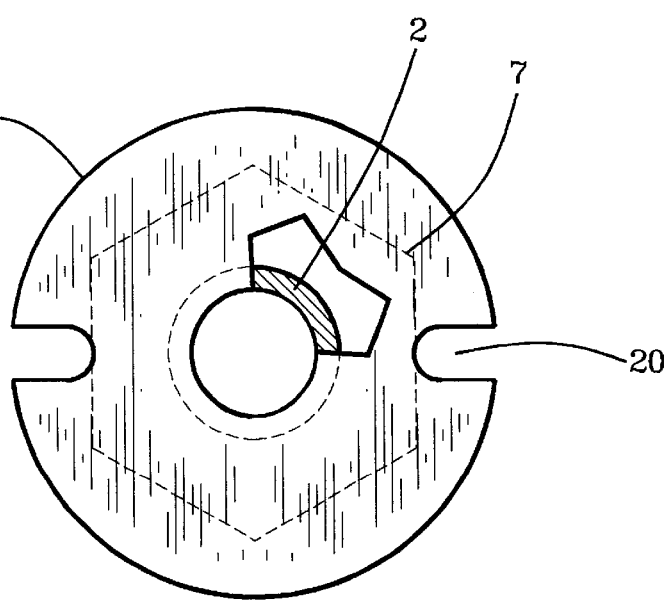
FIG. 9 is a partially cutaway flange-end view of a structure-attachment flange for attachment of a sill cock to a wall from which a water pipe is extended.

Referring to FIGS. 1 and 9, the structure-attachment flange 9 is extended outward radially from a structure-attachment end of the connector sleeve 2 as shown for attachment of a conventional sill cock 11 to an intended structure 10 with fastener shanks that fit into fastener bays 20. In addition to its use for sill cocks 11, a wide selection of sizes, shapes and types of structure-attachment flanges 9 are foreseeable for a wide diversity of sizes, adaptations and applications of this adjustable plumbing connector.

A new and useful adjustable plumbing connector and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An adjustable plumbing connector comprising:
   a connector sleeve having a structure-attachment flange on a flange end, a sleeve seal surface proximate a seal end and a nut-retainer ring on an outside periphery of the connector sleeve intermediate the structure-attachment flange and the seal end;
   a connector nut contained rotatably on the outside periphery of the connector sleeve with the nut-retainer ring buttressing a retainer wall that is intermediate a circumferentially sleeve-engagement inside periphery and a larger circumferentially straight-threaded inside periphery of the connector nut;
   straight inside threading on the inside periphery of the connector nut that is matched to straight outside threading of a predetermined fluid-controller sleeve;
   an inside periphery of the connector sleeve and an inside periphery of the predetermined fluid-controller sleeve having slidable clearance of an outside periphery of an intended pipe;
   the predetermined fluid-controller sleeve having a seal end with a fluid- controller seal surface that is positionable oppositely from the sleeve seal surface collinearly to the intended pipe;
   a seal ring that encompasses the outside periphery of the intended pipe intermediate the sleeve seal surface and the fluid-controller seal surface; and
   the seal ring having sealable contact with at least the outside periphery of the intended pipe, the sleeve seal surface and the fluid-controller seal surface.

2. The adjustable plumbing connector of claim 1 wherein:
   the nut-retainer ring is a retainer flange extended radially from proximate the seal end of the connector sleeve.

3. The adjustable plumbing connector of claim 2 wherein:
   the retainer flange is connector-sleeve material that is forced outward radially proximate the outside periphery of the seal end of the connector sleeve.

4. The adjustable plumbing connector of claim 1 wherein:
   the nut-retainer ring is a snap ring in a snap-ring groove on the outside periphery of the connector sleeve.

5. The adjustable plumbing connector of claim 1 wherein:
   the nut-retainer ring is a threaded ring having inside-diameter threads screwed onto outside-diameter threads on the outside periphery of the connector sleeve.

6. The adjustable plumbing connector of claim 1 wherein:
   the seal ring is a double-tapered ferrule having predetermined resilience, flexibility, material-structure memory and cross-sectional configuration.

7. The adjustable plumbing connector of claim 6 wherein:
   the sleeve seal surface is the inside connector cone that is inside-tapered conically inward intermediate the major diameter and the minor diameter of the connector sleeve;
   the fluid-controller seal surface is the inside fluid-controller cone that is inside-tapered conically inward intermediate the major diameter and the minor diameter of the fluid-controller sleeve;
   the double-tapered ferrule has inside periphery that is forcible to sealing contact with the outside periphery of the intended pipe;
   the double-tapered ferrule has a first tapered surface that is forcible to sealing contact with the inside periphery of the inside connector cone; and
   the double-tapered ferrule has a second tapered surface that is forcible to sealing contact with the inside periphery of the inside fluid-controller cone with thread-screwing force of the connector sleeve in the direction of the fluid controller.

8. A method for using an adjustable plumbing connector which comprises:
   a connector sleeve having a structure-attachment flange on a flange end, a sleeve seal surface proximate a seal end and a nut-retainer ring on an outside periphery of the connector sleeve intermediate the structure-attachment flange and the seal end;
   a connector nut contained rotatably on the outside periphery of the connector sleeve with the nut-retainer ring buttressing a retainer wall that is intermediate a circumferentially pipe-engagement inside periphery and a larger circumferentially straight-threaded inside periphery of the connector nut;
   straight inside threading on the inside periphery of the connector nut that is matched to straight outside threading of a predetermined fluid-controller sleeve;
   the pipe-engagement inside periphery of the connector nut and an inside periphery of the predetermined fluid-controller sleeve having slidable clearance of outside-peripheral portions of an intended pipe;
   the predetermined fluid-controller sleeve having a seal end with a fluid-controller seal surface that is positionable oppositely from the sleeve seal surface collinearly to the intended pipe;
   a seal ring that encompasses the outside periphery of the intended pipe intermediate the sleeve seal surface and the fluid-controller seal surface; and
   the seal ring having sealable contact with at least the outside periphery of the intended pipe, the sleeve seal surface and the fluid-controller seal surface;

the method comprising the following steps:
  inserting a connector portion of the intended pipe through the connector sleeve from the flange end of the connector sleeve;
  placing the seal ring on the intended pipe at a position proximate the seal end of the fluid-controller sleeve;
  placing a fluid-controller portion of the connection portion of the intended pipe proximate the inside periphery of the fluid-controller sleeve;
  engaging the straight inside threading of the connector nut with the straight outside threading of the fluid-controller sleeve;
  orienting the fluid controller to a desired rotational attitude in circumferential relationship to the structure-attachment flange; and
  screwing of the connector nut onto the fluid-controller sleeve to sealing contact of the sleeve seal surface and the fluid-controller seal surface with the seal ring.

9. An adjustable plumbing connector comprising:
a connector nut having an inside periphery that is straight-threaded for threaded connection to a predetermined tubular conveyance intermediate a connection end of the connector nut and an inside sleeve-clearance periphery of the connector nut;
a connector sleeve having an outside periphery that is slidable within the inside sleeve-clearance periphery of the connector nut,
the connector sleeve having an inside periphery with sliding clearance of an outside periphery of an intended pipe;
the connector sleeve having a structure-attachment end, a seal end to which the connector nut is attached rotatably, and a sleeve seal surface on the seal end;
a structure attachment on the structure-attachment end of the connector sleeve;
a conveyance seal surface on a seal end of the predetermined tubular conveyance;
a seal ring that encompasses the outside periphery of the intended pipe intermediate the sleeve seal surface and the conveyance seal surface;
the sleeve seal surface and the conveyance seal surface being structured for sealable contact with the seal ring; and
the seal ring having sealable contact with at least the outside periphery of the intended pipe, the sleeve seal surface and the conveyance seal surface.

10. The adjustable plumbing connector of claim 9 wherein:
the seal ring is a double-tapered ferrule;
the conveyance seal surface is coned internally to receive at least a first predetermined portion of the double-tapered ferrule; and
the sleeve seal surface is coned internally to receive at least a second predetermined portion of the double-tapered ferrule.

11. The adjustable plumbing connector of claim 9 wherein:
the structure-attachment end of the connector sleeve is flanged.

12. The adjustable plumbing connector of claim 9 wherein:
the predetermined tubular conveyance has a least one fluid-directional outlet.

13. The adjustable plumbing connector of claim 9 wherein:
the predetermined tubular conveyance has at least one flow controller.

* * * * *